Dec. 2, 1958
F. K. KNOHL
2,862,413
SELF THREADING SHEET METAL FASTENER FOR
RETAINING SOFT MATERIAL
Filed May 16, 1956
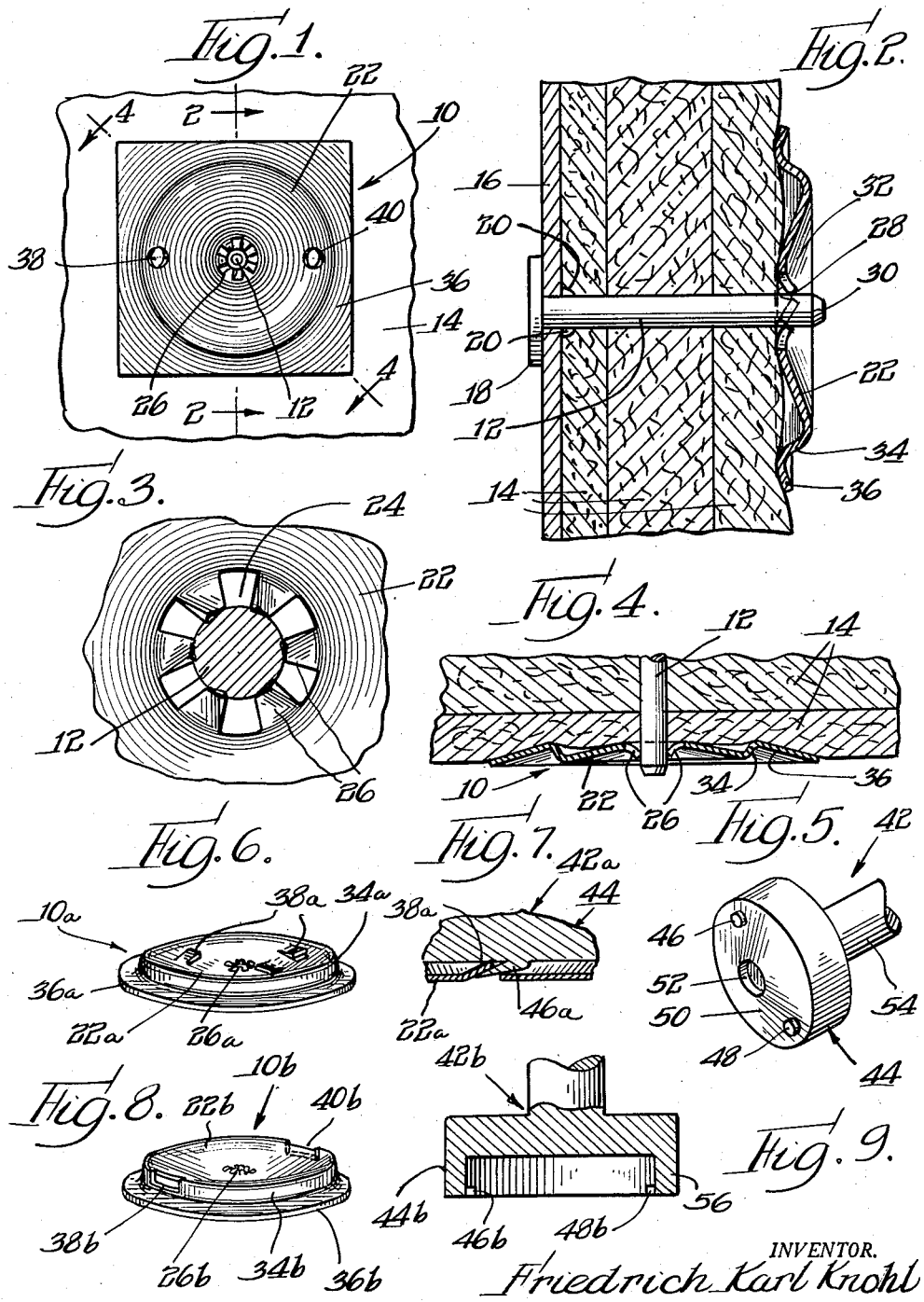
INVENTOR.
Friedrich Karl Knohl
BY
Olson & Trexler
Attys.

United States Patent Office 2,862,413
Patented Dec. 2, 1958

2,862,413

SELF THREADING SHEET METAL FASTENER FOR RETAINING SOFT MATERIAL

Friedrich Karl Knohl, Roselle, Ill., assignor to Illinois Tool Works, Chicago, Ill., a corporation of Illinois Application May 16, 1956, Serial No. 585,287

6 Claims. (Cl. 85—36)

The present invention relates to a novel fastener, and, more particularly, to a novel fastener adapted to be removably applied to an unthreaded stud or the like.

An important object of the present invention is to provide a novel one-piece sheet material fastener of simple and economical construction, which fastener may be easily and removably applied to a stud member or the like and is particularly adapted for retaining sheets or insulating material or the like against a wall or panel.

A more specific object of the present invention is to provide a novel one-piece sheet material fastener of the above described type constructed so as to distribute clamping pressure over a relatively large area of a sheet of insulating material or the like being retained by the fastener, and, also, constructed so as to restrain spreading of the insulating material from beneath the fastener.

Another specific object of the present invention is to provide a novel one-piece sheet material fastener of the type set forth in the preceding paragraphs which is constructed so that it may be formed from relatively lightweight resilient sheet material and have relatively great strength and holding power.

Another object of the present invention is to provide a novel one-piece sheet material fastener which may be removably applied to an unthreaded stud or the like and which is constructed so that forces tending to strip the fastener from the stud in an unauthorized manner cause the fastener to engage the stud more aggressively.

Still another object of the present invention is to provide a novel one-piece sheet material fastener of the above described type having a plurality of stud engaging prongs which are located so as to reduce any possibility of a workman being injured or snagged by the prongs.

A further object of the present invention is to provide a novel one-piece sheet material fastener of the above described type constructed so that it may be engaged and rotated by a simple tool for application to or removal from an unthreaded stud member or the like.

Other objects and advantages of the present invention will become apparent from the following description and the accompanying drawings wherein:

Fig. 1 is an elevational view showing a fastener member embodying the principles of the present invention applied to an unthreaded stud for retaining one or more sheets of insulating material or the like against a panel;

Fig. 2 is an enlarged partial sectional view taken along line 2—2 in Fig. 1;

Fig. 3 is an enlarged fragmentary view showing the manner in which the fastener prongs engage the stud;

Fig. 4 is a fragmentary sectional view taken along line 4—4 in Fig. 1;

Fig. 5 is a fragmentary perspective view of a tool which may be used to apply or remove the fastener shown in Figs. 1 through 4;

Fig. 6 is a perspective view showing a modified form of the present invention;

Fig. 7 is a fragmentary sectional view showing a modified tool applied to the device of Fig. 6, which tool may be used for assembling the device with a stud or the like;

Fig. 8 is a perspective view showing another modified form of the present invention; and Fig. 9 is a fragmentary partial sectional view showing a modified tool which may be used in connection with the fastener of Fig. 8.

Referring now more specifically to the drawings wherein like parts are designated by the same numerals throughout the various figures, a fastener 10 embodying the features of the present invention is shown in Figs. 1 through 4. While various uses for the fastener 10 will suggest themselves, the fastener is particularly adapted to be applied to a stud 12 having a smooth or unthreaded shank for retaining one or more sheets or layers of insulating material 14 against a wall or panel 16. In the embodiment shown, the stud is provided with a head 18 engageable with the outer surface of the workpiece or panel 16 and the stud shank is staked as at 20 for connecting the stud to the workpiece.

The fastener 10 which is preferably formed from resilient sheet metal is provided with a central substantially frusto-conical or concave body section 22 having a central aperture 24 of predetermined diameter. A plurality of prongs 26 extend generally radially inwardly and also axially outwardly from the inner margin of the body portion 22 for engagement with the stud 12. The prongs are formed so that their free inner ends define a circle having a diameter slightly less than the diameter of the stud 12 whereby relatively sharp corners 28 of the axially inclined prongs will aggressively engage the stud in the manner shown. Furthermore, each of the prongs 26 is twisted about its radial axis so that stud engaging free end corner or edge 28 is generally helically disposed about the central axis of the fastener and stud. Thus, the fastener may be easily applied to the stud by first pressing it over the free end of the stud which is preferably bevelled as indicated at 30 and then by turning the fastener so that the edges or corners 28 cut complementary helical thread-like grooves in the stud and cause the fastener to advance on the stud and into clamping engagement with the work structure. It should be noted that the substantially frusto-conical or concave shape of the body portion 22 provides the body portion with relatively great strength and resistance to outward axial deflection or collapsing when it is clamped against the work structure. Furthermore, any axial deflection of the body portion 22 which may take place under the influence of the clamping pressure causes the prongs 26 to be urged even more aggressively into engagement with the stud so as to increase the holding power of the fastener. It should also be noted that the substantially frusto-conical or concave shape of the body portion 22 provides a recess or hollow 32 in which the prongs 26 are located so as substantially to eliminate any possibility of a workman becoming snagged or injured by the ends of the prong.

The outer margin of the body portion 22 merges with a generally axially inwardly extending annular flange 34 which, in turn, merges with a generally radially outwardly extending flange 36. The generally axially extending flange 34 rigidifies the outer periphery of the body portion 22 so as to insure that any axial deflection of the body portion 22 will cause the prong to be urged aggressively into engagement with the stud. When the insulating material or the like being clamped against the wall or panel is relatively soft, the flange 34 also serves, upon being partially embedded in the insulating material, to confine the insulating material and prevent it from spreading radially from beneath the fastener under the clamping pressure. The peripheral flange 36 serves to spread the clamping pressure over a greater area of the insulating material or the like, whereby to further reduce any possibility of the insulating material tearing away from the fastener and to prevent the fastener from being embedded in the insulating material unduly. In the embodiment shown in Figs. 1 through 4, the flange 36 is formed with a rectangular peripheral configuration so that all of the stock material from which the fastener is formed may be utilized. Preferably, the flange 36 is dished or inclined axially outwardly so as to prevent the edges and corners thereof from digging into and tearing the insulating material while the fastener is being turned onto the stud member.

In order to enable the fastener 10 to be turned easily for application to or removal from the stud member, a pair of apertures 38 and 40 is provided in opposite outer marginal portions of the body 22. The margins of these apertures provide generally axially extending abutment surfaces adapted to be engaged by a suitable tool for turning the fastener. Such a tool 42 is partially shown in Fig. 5 and includes a head 44 having pins or lugs 46 and 48 extending axially from its outer end face for entering the holes 38 and 40 of the fastener. Preferably, the outer end face 50 of the tool head is provided with a substantially frusto-conical or convex shape complementary to the concave surface of the fastener body portion 22 so as to eliminate any possibility of axial collapsing of the fastener during application thereof to the work. The tool head is provided with a central recess 52 so as to eliminate interference with the prongs of the fastener. A shank 54 extends from the tool head and is adapted to be connected with a handle or any other suitable means by which the tool may be turned.

Figs. 6 and 7 show a modified form of the present invention which is similar to the above described structure as indicated by the application of identical references numerals with the suffix "a" added to corresponding elements. This embodiment differs in that the peripheral flange 36 is provided with a circular configuration so as to eliminate the relatively sharp corners of the corresponding flange described above. In addition, this embodiment is provided with a plurality of tabs 38a struck from and inclined slightly with respect to the body portion 22a rather than the above described apertures for providing abutments engageable with elements of a tool for turning the fastener. As shown in Figs. 7 the tool for this embodiment is modified by replacing the pins with wedge-like elements 46a adapted to engage beneath the lugs 38a.

Figs. 8 and 9 show another modified form of the present invention which is similar to the above described structures as indicated by the application of identical reference numerals with the suffix "b" added to corresponding elements. In this embodiment slots or openings 38b and 40b are formed in the generally axially extending flange 34b for providing abutment surfaces cooperable with a tool. The head portion 44b of the tool 42b differs from the tools described above in that it is provided with a recess defined by an axially extending peripheral flange 56 for accommodating the body portion and flange 34b of the fastener, and radially inwardly extending lugs 46b and 48b project from the flange 56 for entering into the openings or slots 38b and 40b.

While the preferred embodiments of the present invention have been shown and described herein, it is obvious that many structural details may be changed without departing from the spirit and scope of the appended claims.

The invention is claimed as follows:

1. A one-piece resilient sheet material fastener for retaining a piece of relatively soft material comprising a substantially concavo-convex body of substantial radial extent having an inner margin defining a central aperture and an outer margin offset axially outwardly of said inner margin, said body presenting a substantially convex axially inner work clamping side and defining a hollow with its axially outer substantially concave side, a plurality of generally radially extending prongs spaced around an inner margin of said body and inclined axially outwardly from said inner margins, said body being of substantially greater radial extent than said prongs, said prongs being twisted about their radial axes and including generally helically disposed terminal edges for engaging a stud or the like, said edges being located within said hollow, and an annular generally axially inwardly extending flange means integral with a peripheral margin of said body and cooperating with said body to define an annular recess of considerable width at the clamping side of said body for accommodating said material when the fastener is applied against said material, said flange means terminating in a radially outwardly extending section.

2. A fastener, as defined in claim 1, which includes means providing abutment surfaces spaced around said body cooperable with elements of a rotatable tool which may be used for turning the fastener.

3. A fastener, as defined in claim 2, wherein said body has apertures therethrough adjacent a peripheral margin thereof, edges of said apertures providing said abutment surfaces.

4. A fastener, as defined in claim 2, wherein a plurality of outwardly inclined tabs is struck from said body for providing said abutment surfaces.

5. A fastener, as defined in claim 2, wherein said flange means has opening means therein providing said abutment surfaces.

6. A fastener, as defined in claim 1, wherein said flange means section has a generally rectangular peripheral configuration and is inclined axially outwardly from a junction with the remainder of said flange.

References Cited in the file of this patent

UNITED STATES PATENTS

| | | |
|---|---|---|
| 913,024 | Meacham | Feb. 23, 1909 |
| 1,582,530 | Noll | Apr. 27, 1926 |
| 1,963,535 | Trotter | June 19, 1934 |
| 2,284,081 | Beggs | May 26, 1942 |
| 2,367,790 | Moore | Jan. 23, 1945 |
| 2,408,573 | Morehouse | Oct. 1, 1946 |
| 2,484,192 | Squiller | Oct. 11, 1949 |
| 2,734,547 | Hotchkin | Feb. 14, 1956 |
| 2,743,461 | Urbas | May 1, 1956 |